(12) United States Patent
De Simon et al.

(10) Patent No.: US 6,198,196 B1
(45) Date of Patent: Mar. 6, 2001

(54) METHOD AND DEVICE FOR COMPENSATING FOR MAGNETIC PULL IN A DISCOIDAL MACHINE

(75) Inventors: Eddy De Simon, Jeumont; Yves Milet, Assevent; Alain Bondu, Jeumont, all of (FR)

(73) Assignee: Jeumont Industrie, Courbevoie (FR)

( * ) Notice: Subject to any disclaimer, the term of this patent is extended or adjusted under 35 U.S.C. 154(b) by 0 days.

(21) Appl. No.: 09/077,103

(22) PCT Filed: Nov. 19, 1996

(86) PCT No.: PCT/FR96/01832

§ 371 Date: Dec. 11, 1998

§ 102(e) Date: Dec. 11, 1998

(87) PCT Pub. No.: WO97/19508

PCT Pub. Date: May 29, 1997

(30) Foreign Application Priority Data

Nov. 20, 1995 (FR) .................................................. 95 13739

(51) Int. Cl.⁷ ............................ H02K 11/00; H02K 1/22; H02K 23/00; B61C 3/00; G50B 1/06
(52) U.S. Cl. ...................... 310/268; 310/68 B; 105/53; 180/65.6; 318/254; 318/661
(58) Field of Search .................................. 310/90.5, 68 B, 310/192, 261, 262, 266, 268, 166, 68 R; 105/53; 180/65.6; 318/254, 439, 466, 467, 647, 661, 540

(56) References Cited

U.S. PATENT DOCUMENTS

| | | | |
|---|---|---|---|
| 4,065,189 | * | 12/1977 | Sikorra ........................... 308/10 |
| 4,520,300 | * | 5/1985 | Fradella ........................... 318/603 |
| 4,642,501 | * | 2/1987 | Kral et al. ......................... 310/90.5 |
| 5,117,139 | * | 5/1992 | Flom et al. ....................... 310/90.5 |
| 5,177,387 | * | 1/1993 | McMichael et al. .............. 310/90.5 |
| 5,274,315 | * | 12/1993 | Finocchi ........................... 318/686 |
| 5,440,185 | * | 8/1995 | Allwine ............................ 310/156 |
| 5,574,345 | * | 11/1996 | Yoneta et al. .................... 318/376 |
| 5,703,424 | * | 12/1997 | Dorman ............................ 310/90.5 |
| 5,783,887 | * | 7/1998 | Ueyama et al. .................. 310/90.5 |
| 5,806,363 | * | 9/1998 | Khoi et al. ........................ 73/313 |
| 5,844,339 | * | 12/1998 | Schroeder et al. ............... 310/90.5 |
| 5,856,719 | * | 1/1999 | De Armas ......................... 310/103 |
| 5,969,451 | * | 10/1999 | Lyons et al. ...................... 310/90.5 |
| 6,011,337 | * | 1/2000 | Lin et al. ........................... 310/156 |

FOREIGN PATENT DOCUMENTS

| | | |
|---|---|---|
| 2802753 | 7/1979 | (DE) . |
| 3435628 | 4/1986 | (DE) . |
| 2583231 | 12/1986 | (FR) . |

* cited by examiner

*Primary Examiner*—Thomas M. Dougherty
*Assistant Examiner*—Dang Dinh Le
(74) *Attorney, Agent, or Firm*—Leydig, Voit & Mayer, Ltd.

(57) ABSTRACT

An electrical machine with a discoidal structure comprising rotor and stator discs disposed coaxially and having at least two axial air gaps between the rotor and stator discs. The widths of the axial air gaps are measured and sent to a control unit for being compared so that an offset signal can be generated based on the difference between the widths of the axial air gaps. The offset signal is supplied to a drive module for driving a balancing means in order to cancel an axial magnetic force exerted on either the rotor or stator discs. The deterioration of the electrical machine can be reduced.

12 Claims, 6 Drawing Sheets

Figure 1:
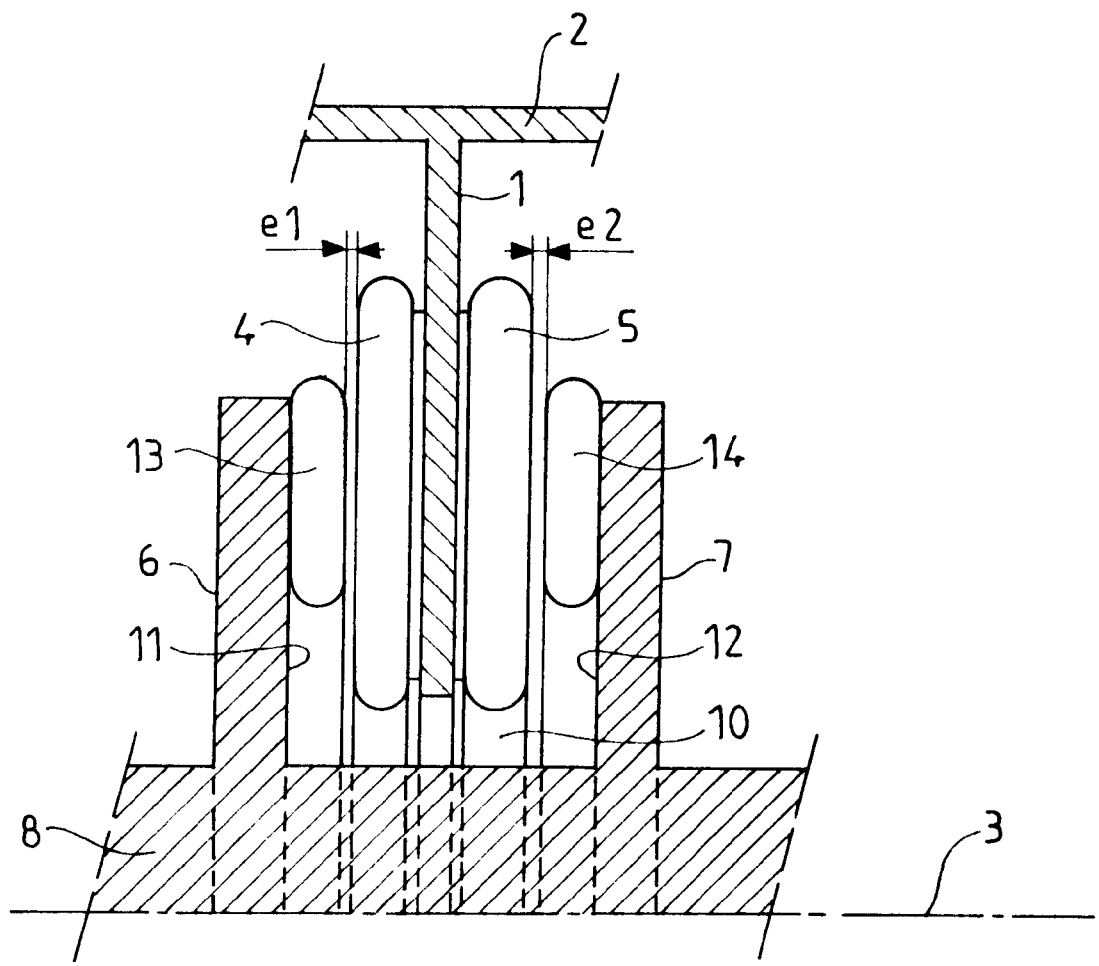

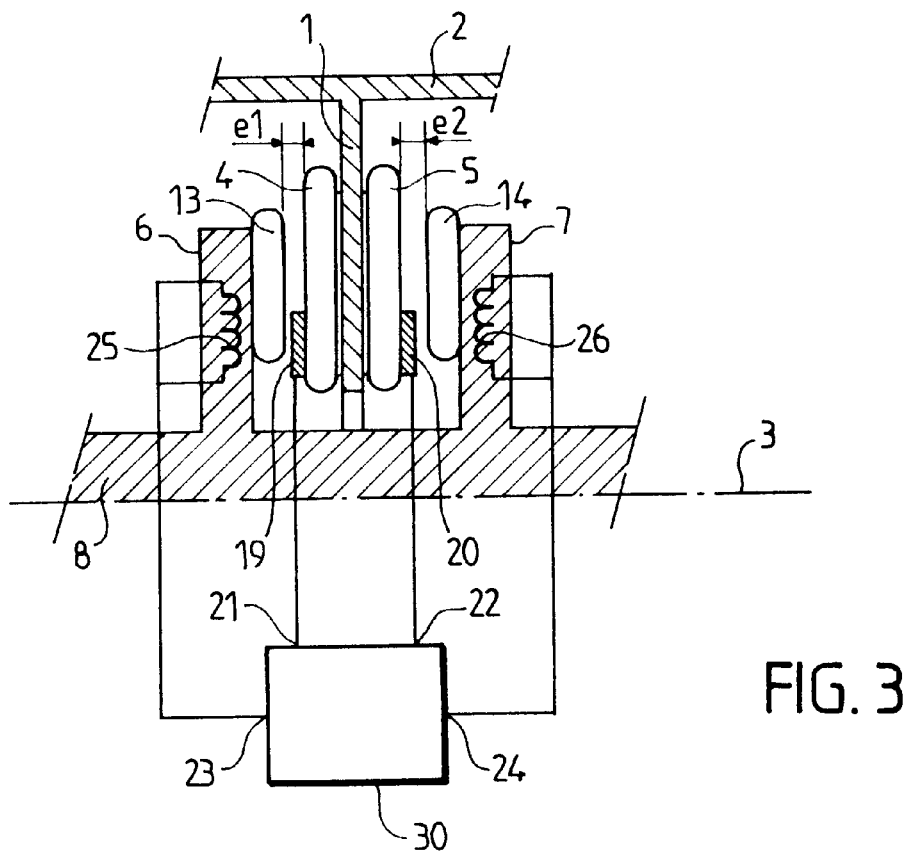
FIG. 3
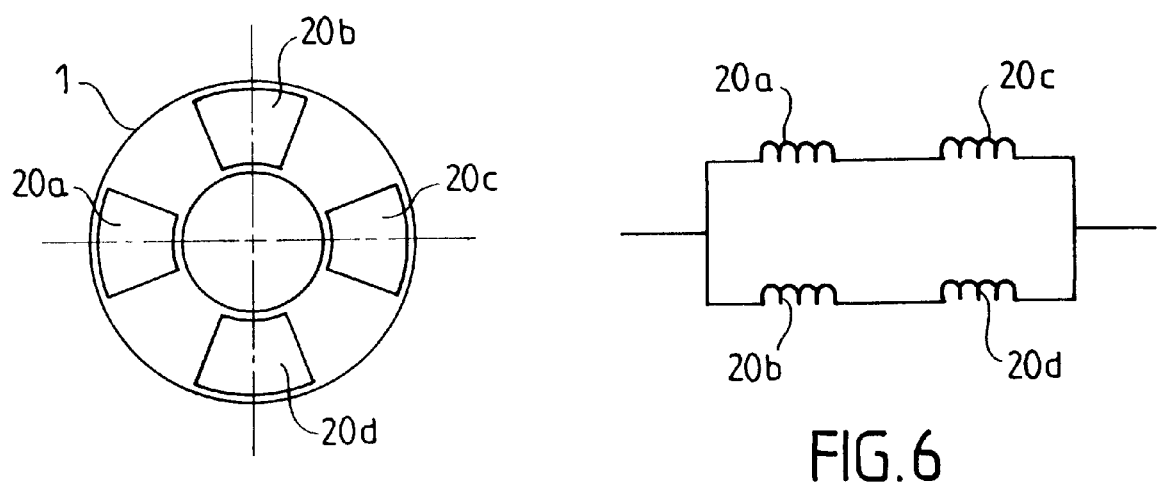
FIG. 5
FIG. 6

METHOD AND DEVICE FOR COMPENSATING FOR MAGNETIC PULL IN A DISCOIDAL MACHINE

BACKGROUND

The present invention places itself in the field of the electric machines with a discoidal structure. It relates more particularly to a method of and a device for the compensation for magnetic pull forces between the rotor and the stator of such a machine.

The electric machines with a discoidal structure comprise at least one disc-shaped stator held on a casing and the central portion of which is generally hollowed out as well as a rotor also in the shape of a disc mounted onto a shaft the axis of which coincides with that of the stator disc.

One may in particular cite the patent FR-2,583,231 which describes a discoidal machine in which the rotor disc is placed between two stator discs, the windings of the rotor and stator discs being placed on confronting faces.

One may also contemplate a discoidal machine comprising a stator disc with a double face placed between both discs of the rotor.

In both cases the faces of the stator and of the rotor are separated by air gaps. At the time of the mounting, the dimensions of these air gaps are provided to be approximatively equal. In this type of machine, the rotor may exhibit axial offsets with respect to the stator in view of the mechanical machining and mounting tolerances of the different elements. One also finds that the dimensions may vary owing to the thermal expansions of the materials and mechanical forces.

The flux which flows through the poles of the discoidal machine comprises two components: the main flux and the secondary flux also called interpolar flux.

The main flux axially extends through each disc. The generated forces therefore have opposite directions and the resultant of these forces theoretically is zero.

The inteirpolar flux comprises variable components as a function of the number of poles and of the dimensions of the air gap. It generates forces which in theory counterbalance one another.

However due to the fact of the dimensional variations appearing inside of the discoidal machine, the forces generated by the interpolar fluxes at the level of each air gap do not counterbalance one another in practice.

Thus during the operation of the machine, substantial axial forces appear on the rotor and the stator, these forces being due to the differences of inteipolar flux on each face of the rotor or stator.

These forces may result in the deterioration of the discoidal machine.

SUMMARY OF THE INVENTION

The invention has as its object to cope with these inconveniences by proposing a method of compensation for the magnetic pull forces inside of an electric machine with a discoidal structure comprising at least three rotor and stator discs disposed coaxially and foiming two air gaps, the external discs being of a type different from that of the internal disc.

The method consists in:
measuring for each one of the two air gaps a same magnitude representative of the value of the air gap,
comparing the said magnitudes and
modifying the fluxes at the level of the air gaps to balance the value of both air gaps and thus to compensate for the magnetic pull forces.

In a first mode of putting into practice, the fluxes of the air gaps are modified by feeding the stator faces in an independent manner.

In a preferred manner the feeding of the stator faces is carried out through the medium of converters each one associated with one face of the stator disc.

In a second mode of putting into practice, the fluxes of the air gaps are modified by generating an additional flux at the level of each air gap.

In a preferred fashion, the said additional flux is generated by currents circulating in at least one inductor.

According to a first alternative embodiment of the method, the said magnitude representative of the value of the air gap is an electromagnetic magnitude, in particular the polar flux, the interpolar flux or the induction.

According to a second alternative embodiment of the method, the said magnitude is a mechanical magnitude in particular the mechanical deformation of the discs or the relative displacement between a rotor disc and a stator disc.

The invention relates also to a device for the compensation for the magnetic pull forces inside of an electrical machine with a discoidal structure comprising at least three rotor and stator discs disposed coaxially and forming two air gaps, the external discs being of a type different of that of the internal disc, characterized in that it comprises:

for each air gap, a means for the measurement of a magnitude representative of the value of the said air gap, disposed on one of the faces of one of the discs forming the said air gap, the said magnitude being identical for both measurement means, and a control unit the inputs of which are connected to the said measurement means and the outputs of which are connected to balancing means, the output signals from the control unit driving the said balancing means so as to balance the fluxes between both air gaps and thus to compensate for the said pull forces.

In a first alternative embodiment, the balancing means are constituted by converters associated each one with one stator disc face.

In a second alternative embodiment, the balancing means are constituted by at least one inductor for each air gap, disposed on one face of one of the discs forming the said air gap.

The following characteristics may also be taken into consideration isolately or according to all their technically possible combinations some inductors are the windings of the rotor disc or discs; the control unit comprises:
  a regulation module receiving at the input the signals issued from the measurement means and
  a drive module connected to a device for feeding with current and to the said inductors, the regulation module delivering a signal to the drive module for diverting the current issued from the feeding device into the said inductors, the regulation module comprises
  means for converting the signals issued from the measurement means into continuous signals and,
  means for comparing the said continuous signals, connected to an integral regulation device,
each measurement means is constituted by at least one turn,
each measurement means is constituted by at least one Hall effect sensor,
each measurement means is constituted by at least one Foucault current displacement sensor, each measurement means is constituted by at least one strain gauge, the compensation device comprises a safety systeme generating an alarm or the emergency stop of the machine when the output of the comparator means is above a determined threshold value.

BRIEF DESCRIPTION OF DRAWING FIGURES

Figure 2:
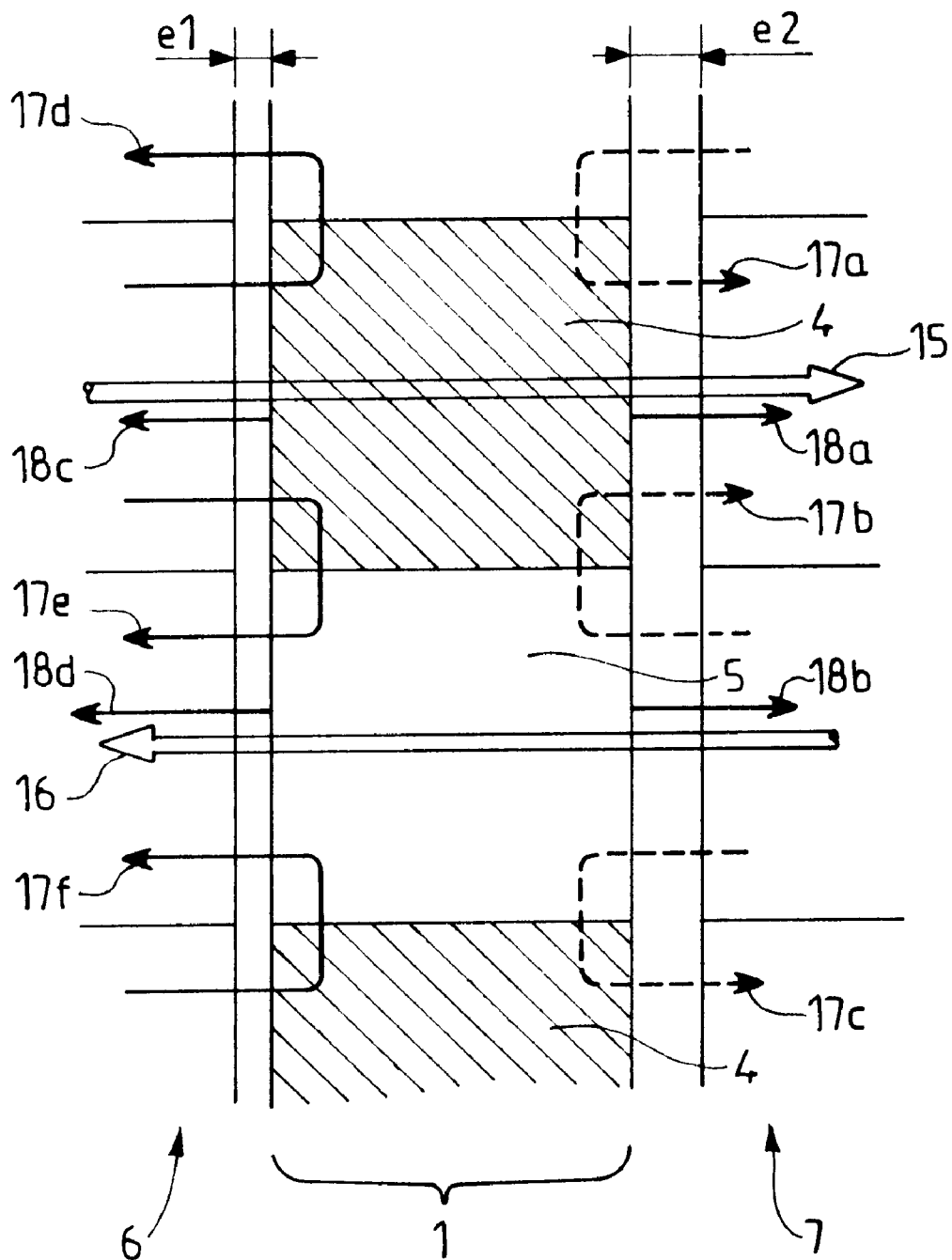
Figure 4:
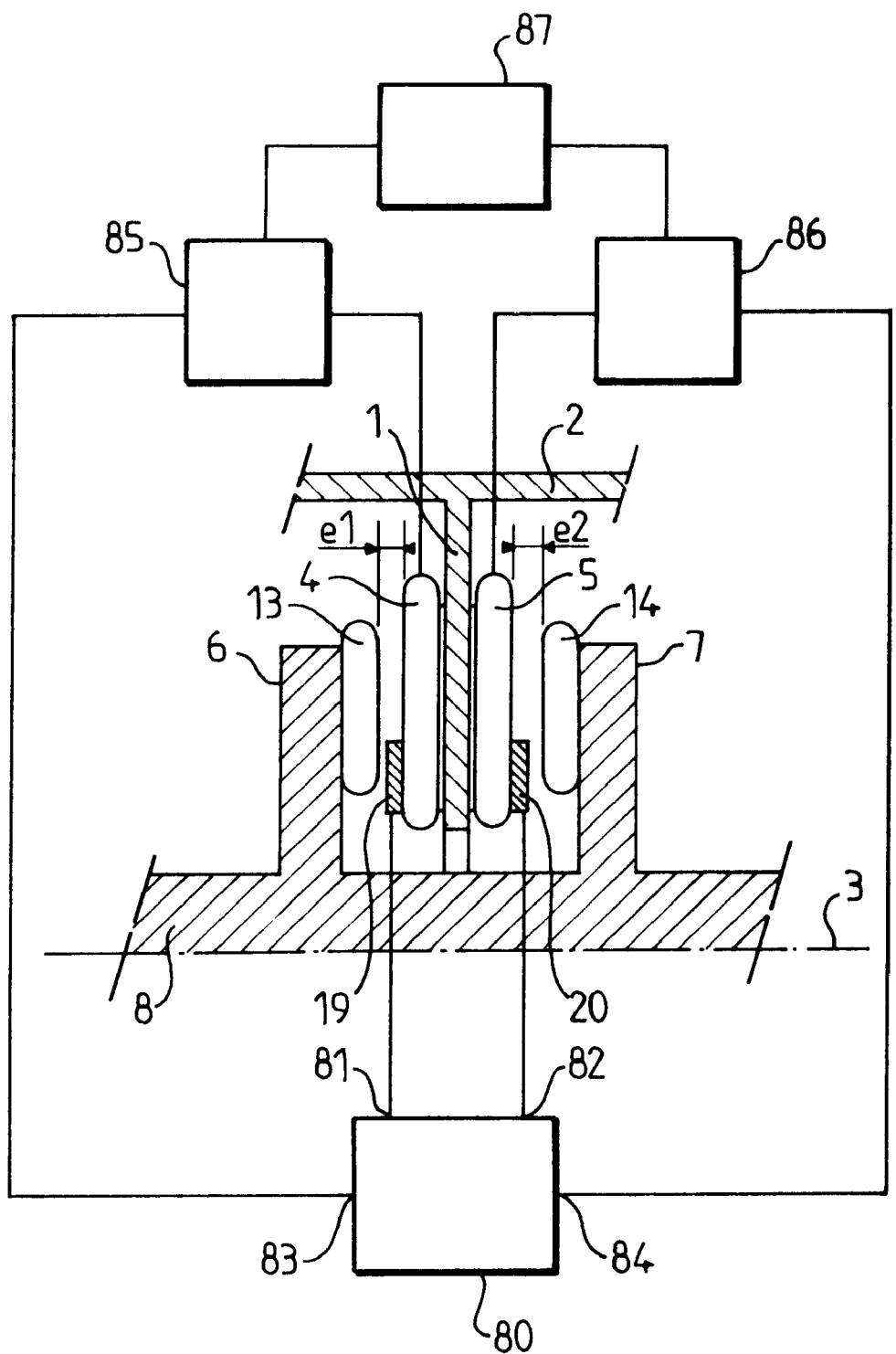

The invention will be better understood and further objects, advantages and characteristics thereof will appear more clearly at the reading of the description which follows, made with reference to the attached drawings showing non limiting exemplary embodiments of the invention and on which:

FIG. 1 shows one diagrammatic half section of an example of rotor/stator unit of a discoidal machine, FIG. 2 is a partial diagrammatic view in developed configuration of the unit of FIG. 1, FIG. 3 diagrammatically illustrates an example of compensation device according to the invention, FIG. 4 illustrates another example of compensation device according to the invention, FIG. 5 illustrates an example of distribution on one face of a disc of sensors for the measurement of the interpolar flux, FIG. 6 shows an example of connection of turns for the measurement of the interpolar flux, FIGS. 7 to 10 illustrate four embodiments of a compensation device according to the invention.

The elements common to the different figures are designated by the same references.

DETAILED DESCRIPTION

FIG. 1 diagrammatically shows a partial half section of an example of electric machine with a discoidal structure.

This machine comprises a stator disc 1 held by conventional mechanical means on an envelope casing 2 shown partially.

This disc exhibits a central portion 10 which is hollowed out and it is centred on the axis 3 of the machine. The stator disc 1 carries on each one of its external faces, windings 4,5 forming magnetic poles.

The rotor comprises two discs 6 and 7 made fast to the shaft 8 which extends through the hollowed-out central portion 10 of the stator. The axis of the shaft 8 coincides with the axis 3 of the machine.

Each rotor disc 6,7 comprises on its face 11,12 opposite the stator disc 1, windings 13,14 forming an alternating North poles and South poles.

Between the internal face of the rotor discs 6,7 and the external face of the stator disc 1 there is left an air gap e1, e2. These air gaps theoretically have the same value on either side of the stator disc 1. However in view of the tolerance differences of manufacture and of mounting, the value of the air gaps is different in practice.

During the operation of the machine, the latter warms up. With the cooling not being perfectly homogenous in the whole machine, this heating reflects itself by variations of dimensions. These variations depend on the operating temperature and add themselves to the tolerance differences on the dimension of the air gaps.

Similar findings may apply to a discoidal machine comprising a central rotor disc and a stator consisting of two discs as illustrated in the patent FR-2,583,231.

A partial view in developed configuration according to FIG. 2 shows the rotors/stator assembly of FIG. 1. This assembly comprises the rotor discs 6,7 and the stator disc 1 fitted with magnetic poles 4,5 with reversed polarity.

The arrows 15 and 16 show the main flux which flows through the poles 4,5. The direction of the main flux is reverse from one pole to the other one according to the polarity thereof.

The pole forces generated in front of each pole by the main flux also are of opposite direction and practically equal. Therefore, the resultant of these forces on the assembly of the rotors/stator disc is practically zero.

The arrows 17a, 17b, 17c, 17d, 17e, 17f represent the interpolar flux which circulates from one pole to the other one. The arrows 18a, 18b, 18c, 18d designate the pole forces exerted upon the discs by the different interpolar fluxes.

If these interpolar fluxes were all of the same value, the resultant of the forces exerted by the latter would practically be zero.

However as explained previously, air gaps e1 and e2 are of different dimensions. In addition during the operation of the machine, variations of dimensions appear, these variations being due to thermal expansions and to mechanical deformations. Consequently the resultant of the forces exerted by the interpolar fluxes is not zero in practice.

Thus there remains a pull force between one face of the stator disc 1 and one of the rotor discs 6,7. The face of the rotor disc subjected to this pull force corresponds to that for which the air gap with the stator disc is the smallest one.

To a first approximation, one may consider that the force exerted upon each face of the discs be equal to:

$$F = \beta^2 S/(2\mu_0)$$

with:

F=force on each face of the disc

β=induction in the air gap

S=surface $\mu_0$ =permeability in the air gap.

If the air gaps have not an equal value, one may estimate that the resulting pull force which exerts itself upon the face of the rotor disc for which the air gap of the stator disc is the smaller one, e1 in the example shown on FIG. 1, may be expressed in the form:

$$\beta \times \Delta\beta \times S/(2\mu_0)$$

By way of example, a force of about 8 tons per square meter is then exerted upon the rotor disc for the following values: β=1 Tesla and Δβ=0.1 Tesla.

This resulting pull force has the effect of reducing the value of the air gap e1 in front of one of the faces of the stator disc 1, this value already being the smaller one and of increasing the value of the air gap e2 in front of the opposite face of the stator disc, this value initially being the larger one.

Furthermore, the variations of the value of the air gaps e1 and e2 also modify the value of the interpolar fluxes and therefore of the corresponding forces. These forces increase on the face of the rotor disc corresponding to the air gap e1 which decreases and they decrease on the opposite face.

Thus the difference between the pull forces increases thereby tending to still more reduce the value of the air gap e1, initially the smaller one, and to increase the value of the air gap e2 in front of the opposite face of the stator disc.

The increase of these pull forces on one side of the stator disc (towards the air gap e1) and the decrease of these forces on the opposite side result in substantial forces and a deformation of the stator and rotor discs. In the extreme, a rotor disc may come and rub upon the stator disc, thereby resulting in the deterioration of the windings and the destruction of the machine.

One now refers to FIG. 3 which illustrates the method according to the invention permitting the compensation for the magnetic pull forces between the rotor and the stator of an electric machine with a discoidal structure, the rotor and the stator forming two air gaps.

As on FIG. 1, the discoidal machine comprises a stator disc 1 and two rotor discs 6,7, all the discs being centred on the axis of rotation 3.

Means 19, 20 are placed on each face of the stator disc 1 for measuring a magnitude representative of each air gap e1, e2, for example of the electromagnetic type (in particular the flux flowing through each assembly of rotor/stator discs, the interpolar flux or the induction) or of the mechanical type (in particular the displacement between a rotor disc and the stator disc or a mechanical deformation).

In the example shown on FIG. 1, the means 19, 20 permit measurement of the flux flowing through each assembly of rotor/stator discs, corresponding to one portion of the polar flux, consisting of the main flux and of the interpolar flux.

These measurement means are, for example, turns disposed on each face of the stator disc 1. One may note that the measurement discs are, not necessarily on the central disc.

The technically simplest solution is to dispose the measurement means on the stator of the machine, i.e. according to the type of discoidal machine retained, on the central disc or on the end discs. However, it is also possible to place the measurement means on the rotor disc or discs.

As previously stated, the fluxes measured by the means 19, 20 create pull forces the resultant of which generally is not zero, taking into account in particular different dimensions of the air gaps.

The signal generated by each measurement means 19, 20 is applied to both inputs 21, 22 of a control unit 30. The control unit may determine an error signal which in particular is a function of the dimensions of the air gaps.

The outputs 23, 24 of the control unit are connected to inductors 25, 26 mounted on the face of each rotor disc in front of the stator disc 1. The inductors 25, 26 correspond to the windings 13, 14, respectively, of each rotor disc 6, 7. They may also assume the shape of additional inductors.

The control unit 30 delivers at the level of its outputs 23, 24, signals as a current, these signals creating an induced field and therefore an additional flux. The control unit 30 determines the value of these signals to increase the weakest interpolar flux et to reduce the strongest interpolar flux.

Thus, the inductors 25, 26 generate a force equal to and of a direction opposite to the resultant of the pull forces and constitute means for balancing the magnetic pull forces. The axial forces which exert themselves upon the rotor and stator discs are thus made zero, even if the air gaps e1 and e2 are different by construction.

With reference to FIG. 4, an alternative embodiment of the method according to the invention will now be described.

This alternative embodiment of the compensation method suits a machine driven by converters, one converter being provided for each face of the stator disc.

As on FIG. 3, measurement means 19, 20 are provided on each face of the stator disc. The signal generated by each measurement means 19, 20 is applied to both inputs 81, 82 of a control unit 80.

Both outputs 83, 84 of the control unit are connected to converters 85, 86. Each one of these converters is associated with one face of the stator disc 1.

The converters 85, 86 are connected to at least one electric feeding unit 87. They may feed the faces of the stator disc alone or in association with other sources.

The control unit 80 delivers at the level of its outputs 83, 84, different signals which act independently upon the converters 85, 86 feeding each face of the stator 1, it being understood that other mechanical, electric or electronic parameters may also intervene in the control of the converters.

These signals may act in particular upon the feed voltage, the feed current, the internal angle or the wave shape.

The control unit 80 determines the value of these signals for increasing the to weakest interpolar flux and reducing the strongest interpolar flux. In this alternative embodiment, the converters constitute means for balancing the magnetic pull forces.

This alternative embodiment of the compensation method is particularly well adapted to the machines with permanent magnets for which the compensation for the pull forces by means of an additional flux is difficult.

It also suits asynchronous discoidal machines.

As previously stated, other magnitudes representative of the air gaps e1, e2 could be measured, for example:

the interpolar flux in particular by disposing one measurement turn upon the side wall of a stator slot, the polar flux on one or several poles or pole portions (on condition that the resultant of the measured flux be not zero at each moment, which would, for example be the case if the measurement was effected on one complete face of the disc), the induction, in particular by means of a Hall effect sensor, the relative displacement between one rotor disc and the stator disc in particular by means of a Foucault current displacement sensor or the mechanical deformation of the discs, for example with strain gauges.

FIG. 5 illustrates one example of distribution of the measurement turns on one face of the stator disc 1, all the turns forming a measurement means.

Four turns 20a, 20b, 20c, 20d are distributed along orthogonal diameters on the stator disc 1. As a function of the value of the diameter of the stator disc, the amount of turns may valy, the total number may be even or odd.

FIG. 6 shows an example of a diagram for connecting the turns illustrated on FIG. 5. Thus two turns 20a, 20c; 20b, 20d located on the same diameter of the stator disc 1 at opposite ends are connected in series. The groups of two turns are connected in parallel.

FIG. 6 shows a connection diagram for two pairs of turns. This diagram may be extended to more than two pairs of turns. In this case, all the groups of two turns are also connected in parallel.

One may also contemplate to connect the turns in series, the essential point being to obtain a resultant electric or electronic signal which is compatible with the control units 30 or 80.

The measurement turns may be disposed differently from the example illustrated on FIG. 5 where they are distributed over the whole face of the stator disc 1. However a different number of sensors distributed or not distributed in a homogeneous fashion could have been provided.

In a general manner, the number and the distribution of sensors should be chosen to give a signal representative of the flux in each air gap in order that the control unit may effectively regulate the interpolar fluxes.

Figure 7:
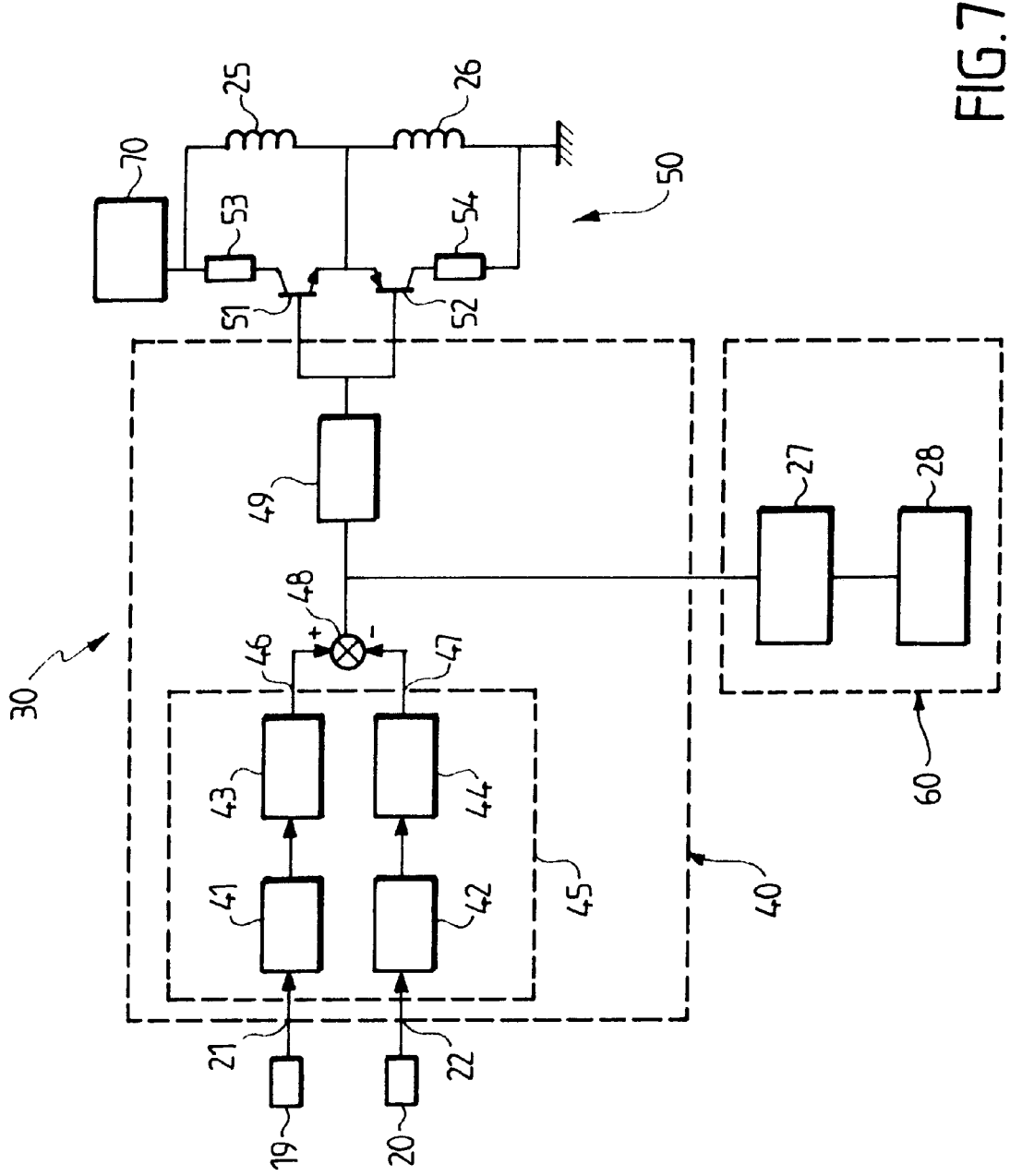

FIG. 7 illustrates a first embodiment of the control unit 30 for the inductors 25, 26.

In a general manner, the control unit 30 comprises a regulation module 40 and a drive module 50.

The inputs 21, 22 of the regulation module 40 coincide with the inputs of the drive unit 30. These inputs 21, 22 receive the signals emitted by the measurement means 19, 20 disposed in the example illustrated on FIG. 3 on each face of the stator disc 1.

The regulation module 40 comprises a device 45 which convelts the signals transmitted to the inputs 21, 22 into continuous signals delivered at the level of the outputs 46 and 47 of the device 45.

Thus when the measurement means 19, 20 deliver an undulated voltage, the latter is rectified by elements 41, 42 and then filtered by the elements 43, 44.

The signals delivered by the device 45 are applied to inputs of the comparator means 48. The latter delivers a deviation signal which is applied on the one hand to an integral regulation device 49 and on the other hand to a safety system 60.

In a general manner, the concept of the regulation module 40 depends on the measurement means and on the technological choice which is retained. Numerous alternative embodiments may thus be contemplated.

The embodiment described hereinabove suits measurement means in the shape of turns for the measurement of the flux. For the same type of sensors, the regulation module 40 may also be conceived to directly compare the alternating signals issued from the turns with a phase reference. In this case, the rectifier elements 41 and 42 are omitted and the filtering elements 43 or 44 are removed or adapted for only, for example, retaining the fundamental wave of the signal.

In the case were the measurement means are Hall effect sensors placed on the rotor disc or discs for the measurement of the induction, the delivered signals are mainly continuous. The regulation module 40 may then be conceived to compare the signals after a filtering of the high frequencies.

The safety system 60 comprises a defect detector 27 and a module 28 located in a control station of the machine.

The defect detector 27 delivers a signal if the value of the deviation signal delivered by the comparator 48 corresponding to the difference of the measured fluxes exceeds a determined threshold value. This signal of the on or off type is applied to the module 28. This module permits generation of an alarm or an emergency stop of the machine to avoid its destruction.

The integral regulation device 49 has the function of adapting the signal issued from the comparator means 48 to the control of the drive module 50. The output signal of the device 49 is thus transmitted to the drive module 50.

In a general manner this drive module is a device for the interlocking in follow-up relationship the relative position of the rotor and stator discs by means of a magnitude representative of the off centering of the discs or also of the spacing between the air gaps appearing on a discoidal machine.

In the example illustrated on FIG. 7, this module 50 is connected to a feeding device 70 and comprises two power transistors 51, 52. The latter are driven by the signal delivered by the regulation device 49. The transistors 51, 52 are connected to the inductors 25, 26 disposed on each rotor disc 6,7 through the medium of resistors 53, 54.

Thus the transistors 51, 52 partially divert the direct current issued from the feeding device 70 into the resistors 53, 54. And the current in the inductors 25, 26 varies inversely of the currents in the resistors 53, 54.

To illustrate the operation of the control unit 30, one assumes that the value of the flux measured by the measurement means 19 is higher than that measured by the measurement means 20.

With this assumption, the rotor disc 6 is subjected to a pole force tending to reduce the air gap e1.

The signal issued from the comparator means 48 is positive. The integral regulation device also delivers a positive signal which is transmitted to the drive module 50 and applied to the bases of the transistors 51 and 52. This signal ensures the conduction of the transistor 51 and blocks the transistor 52.

The current circulating in the inductor 26 will be higher than that circulating in the inductor 25 and its value is such that it generates a flux compensating for the pull force to which the rotor disc 6 is subjected.

Likewise when the signal issued from the comparator means 48 is negative, the regulation device 40 delivers a negative signal applied to the base of the transistors. Due to this fact, the transistor 51 blocks current flow whereas the transistor 52 is conducting.

When the signal issued from the means is substantially zero, the transistors 51 and 52 will both block current flow.

Preferably, the regulation device 49 integrates a shift of zero point to obtain the equilibrium at the output for a non-zero signal at the input. Thus the control unit does not regulate the flux when the difference between the signals delivered by the measurement means 19, 20 is lower than a determined value.

Figure 8:
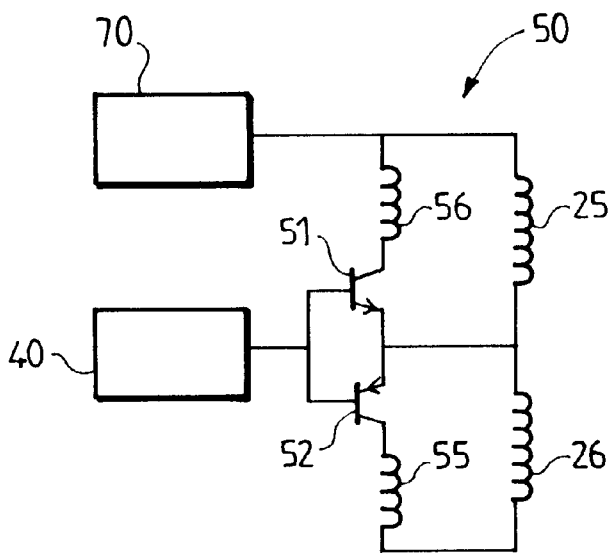

FIG. 8 illustrates another embodiment of the control unit 30. It essentially is the drive module 50 which is modified with respect to the embodiment of FIG. 7.

The drive module 50 still comprises the transistors 51, 52 and also inductors 55, 56. The inductors 55, 56 are connected in parallel with the inductors 26, 25. Inductors 25, 55 are disposed on the rotor disc 6 whereas the inductors 26, 56 are disposed on the rotor disc 7.

The regulation module 40 controls the transistors 51, 52 so as to partially divert the current from the inductors 25, 26 into the inductors 55, 56.

To illustrate the operation of the control unit, one assumes that the value of the flux measured by the measurement means 19 is higher than that measured by the measurement means 20.

The signal issued from the comparator means 48 then is positive like the one delivered by the integral regulation device 49. This signal ensures the conduction of the transistor 51 and blocks the transistor 52.

The current issued from the feed 70 then increases in the inductor 56 whereas the current in the inductor 25 decreases. Since each one of these windings 25, 56 is located on one rotor disc 6, 7 in front of the opposite faces of the stator disc 1, the flux decreases towards the inductor 25, i.e. towards the rotor disc 6 and increases towards the inductor 56, i.e. towards the rotor disc 7.

For the inductors 55 and 26, the control of the currents is the reverse of that which has been described for the inductors 25 and 56.

The drive module 55 thus permits to catTy out a balancing of the fluxes on either side of the stator disc owing to the regulation module 40.

Figure 9:
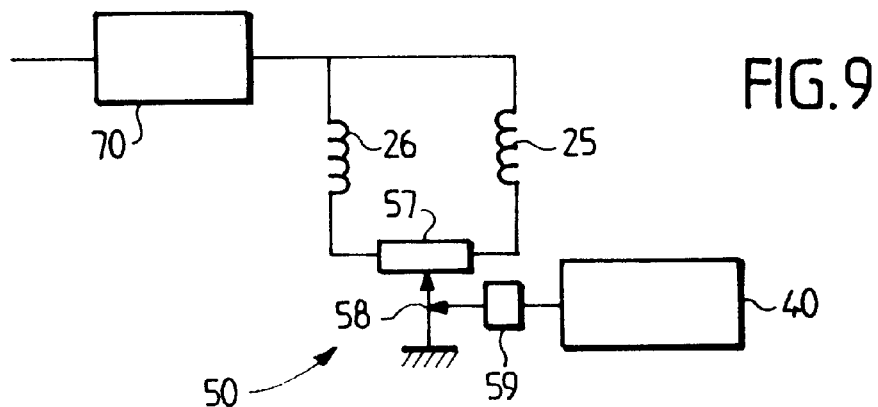

FIG. 9 shows another embodiment of the drive module 50 for the inductors 25 and 26.

As illustrated on FIG. 3, each one of these inductors 25, 26 is placed in front of the opposite faces of the stator disc 1. These inductors are connected in parallel on one side to the direct current feed 70 and on the other side to each end of a rheostat 57.

The slider 58 of the rheostat is connected to the mass as illustrated on FIG. 9 or to the other output of the feed 70.

The regulation module 40 controls a servo-motor 59 the output axis of which is connected mechanically to the slider 58 of the rheostat.

The regulation module 40 delivers a signal which permits to make vary the slider of the rheostat. The module 40 thus varies the position of in the reverse direction the value of the currents in the inductors 25, 26. This varies the fluxes generated by these inductors and thus balances the forces exeited upon the opposite faces of the stator.

Figure 10:
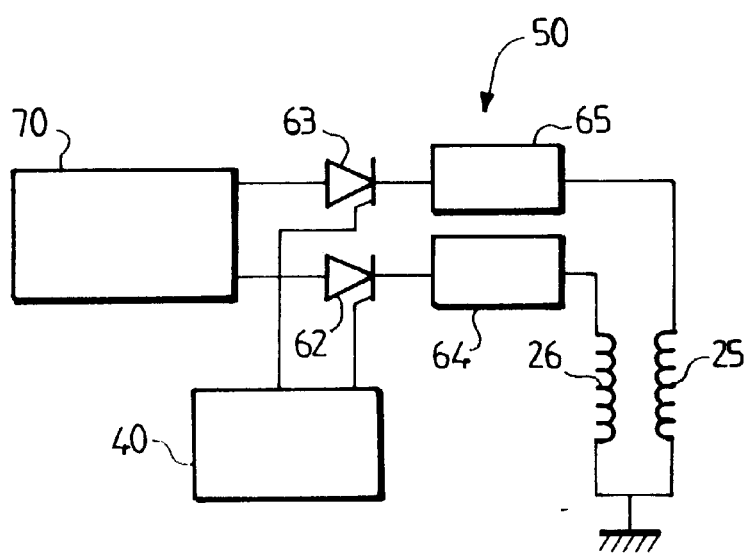

FIG. 10 shows another embodiment of the drive module 50 for the inductors 25 and 26 disposed as illustrated on FIG. 3.

The drive module 50 comprises two electronic switches 62, 63 such as transistors or thyristors.

The feeding device 70 delivers an alternating current to the input of these two switches 62, 63 which are furthermore controlled by the regulation module 40.

The control current delivered by the switches 62, 63 is filtered by the elements 64, 65, for example, low-pass filters. The elements 64, 65 are connected in series to the inductors 25, 26. They attenuate the undulation and to produce, at the level of the rotor discs, a pseudo-direct current in order to limit the losses due to a Foucault current.

The switches 62, 63, the elements 64, 65 and the inductors 26, 25 are connected in parallel. The other end of the inductors 25, 26 is connected to the mass.

In all the examples illustrated with reference to FIGS. 7 to 10, the signals delivered by the regulation module 40, by means of the drive device 50, adjust the alternating currents which feed the inductors 25, 26 so that the fluxes generated by the inductors cancel out the resultant pull force due to the difference between the air gaps of the machine.

The description which precedes has been made for a machine comprising a rotor/stator assembly defining two air gaps. This assembly may consist of a stator disc placed between two rotor discs or of a rotor disc placed between two stator discs. If the machine comprises several rotor/stator assemblies, the method should be applied for each one of these assemblies and one may therefore provide as many devices for the compensation for the magnetic pull forces as there are rotor/stator assemblies. One may also group them into two or several sub-assemblies, capable of adapting themselves to the compensation devices such as described previously.

What is claimed is:

1. A device for compensation of magnetic pull forces inside a rotating electrical machine with a discoidal structure comprising:
    a discoidal rotating electrical machine having a total of at least three rotor and stator discs disposed coaxially and having at least two air gaps between facing rotor and stator discs, each air gap having a respective width between facing rotor and stator discs, wherein the air gaps may have different widths;
    measurement means for measuring magnitude of the width of each of the air gaps, disposed on a face of a disc defining each air gap and generating signals representative of corresponding gap widths;
    balancing means for balancing magnetic fluxes extending within the at least two air gaps; and
    a control unit having inputs connected to said measurement means to receive from said measurement means the signals representative of corresponding gap widths, and including means for comparing the signals from said measurement means to each other and outputting an offset signal, based on a difference between the signals from said measurement means, supplied to a drive module for driving said balancing means, signals from said control unit driving said balancing means to compensate for and cancel an axial magnetic force exerted on at least one of said rotor and stator discs due to differences in widths of the air gaps of the discoidal rotating electrical machine.

2. The device according to claim 1, wherein
    said balancing means comprises at least one inductor for each air gap, disposed on a face of one of the rotor and the stator disc facing the corresponding air gap,
    said control unit has inputs connected to said measurement means and comprises a regulation module having an input receiving the signals from said measurement means, said regulation module including means for converting the signals from said measurement means into continuous signals, and
    said means for comparing compares the continuous signals to produce the offset signal, said means for comparing being connected to an integral regulation device and said drive module being connected to a current feeding device and to said at least one inductor for each air gap, said means for comparing delivering, through said integral regulation device, the offset signal to said drive module for diverting a current flowing from the current feeding device to said at least one inductor for each air gap, to compensate for the axial magnetic force.

3. The device according to claim 2, comprising a safety system generating an alarm for emergency stopping of the electrical machine when an output of the means for comparing is higher than a threshold value.

4. The device according to claim 1, wherein said balancing means comprises at least one inductor for each air gap, disposed on a face of one of the rotor and stator discs facing the corresponding air gap.

5. The device according to claim 4, wherein said inductors are windings of the rotor or stator discs.

6. The device according to claim 4, wherein said control unit comprises a regulation module having an input receiving the signals generated by said measurement means, and wherein said drive module is connected to a current feeding device and to said at least one inductor for each air gap, said regulation module delivering the offset signal to said drive module for diverting a current flowing from the current feeding device to said at least one inductor for each air gap.

7. The device according to claim 6, wherein said regulation module comprises means for converting the signals generated by said measurement means into continuous signals, and wherein said means for comparing compares the continuous signals to each other to output the offset signal, said means for comparing being connected to an integral regulation device.

8. The device according to claim 7, comprising a safety system generating an alarm for emergency stopping of the electrical machine when an output of the means for comparing is higher than a threshold value.

9. The device according to claim 1, wherein said measurement means comprises at least one turn.

10. The device according to claim 1, wherein said measurement means comprises at least one Hall effect sensor.

11. The device according to claim 1, wherein said measurement means comprises at least one Foucault current displacement sensor.

12. The device according to claim 1, wherein said measurement means comprises at least one strain gauge.

* * * * *